(12) United States Patent
Killalea (10) Patent No.: US 8,620,872 B1
(45) Date of Patent: Dec. 31, 2013

(54) SYSTEM FOR COMPARING CONTENT

(75) Inventor: Tom Killalea, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 1189 days.

(21) Appl. No.: 12/208,126

(22) Filed: Sep. 10, 2008

(51) Int. Cl.
  *G06F 7/00* (2006.01)
  *G06F 17/00* (2006.01)
(52) U.S. Cl.
  USPC .......................................................... 707/687
(58) Field of Classification Search
  None
  See application file for complete search history.

(56) References Cited

U.S. PATENT DOCUMENTS

| | | | |
|---|---|---|---|
| 5,293,629 A * | 3/1994 | Conley et al. | 717/154 |
| 6,289,342 B1 * | 9/2001 | Lawrence et al. | 1/1 |
| 6,941,262 B1 * | 9/2005 | Kurzweil et al. | 704/9 |
| 6,944,821 B1 * | 9/2005 | Bates et al. | 715/209 |
| 6,976,170 B1 | 12/2005 | Kelly | |
| 7,801,824 B1 * | 9/2010 | Bryar et al. | 705/65 |
| 2003/0164849 A1 * | 9/2003 | Barrie et al. | 345/733 |
| 2003/0172066 A1 * | 9/2003 | Cooper et al. | 707/7 |
| 2004/0117761 A1 * | 6/2004 | Andrews et al. | 717/101 |
| 2005/0015675 A1 * | 1/2005 | Kolawa et al. | 714/38 |
| 2005/0114840 A1 * | 5/2005 | Zeidman | 717/126 |
| 2005/0160363 A1 * | 7/2005 | Bhogal et al. | 715/530 |
| 2005/0223354 A1 * | 10/2005 | Drissi et al. | 717/114 |
| 2006/0218492 A1 * | 9/2006 | Andrade | 715/523 |
| 2007/0044075 A1 * | 2/2007 | Koning et al. | 717/122 |
| 2008/0071803 A1 * | 3/2008 | Boucher | 707/100 |
| 2008/0077570 A1 * | 3/2008 | Tang et al. | 707/5 |

OTHER PUBLICATIONS

Douglas MacMillan, Looking Over Turnitin's Shoulder, Business Week, Mar. 13, 2007, The McGraw-Hill Companies.

* cited by examiner

*Primary Examiner* — Uyen Le
(74) *Attorney, Agent, or Firm* — Knobbe Martens Olson & Bear LLP (57) ABSTRACT

A method for comparing content can include receiving first content generated by an author over a communications medium and comparing at least a portion of the first content to at least a portion of second content using one or more content-matching techniques to detect matched content. The method may further include providing content-matching feedback over the communications medium. The content-matching feedback can include suggestions for changing at least a portion of the first content based on the matched content. In some implementations, the first content can include a document written by the author, and the second content can include one or more publications.

30 Claims, 4 Drawing Sheets

SYSTEM FOR COMPARING CONTENT

BACKGROUND

The practice of generating content for publication, such as writing articles, Web logs (blogs), etc., often involves describing or incorporation aspects of content generated by other authors. Authors may find such referenced content by researching publications, which can include books, periodicals, online articles, blogs, and the like. Typically, authors are encouraged, or required, to directly reference (such as through citations or bibiliographies) any publications that they quote or paraphrase in their published content. References to publications give attribution to the originators of thoughts and ideas. References can also include identification information that enable readers to find the publications should they wish to check facts, conduct further research, or the like.

Some authors may omit references to others' works, either intentionally or unintentionally. By doing so, an author may be committing plagiarism, copyright infringement, and other acts that may give rise to legal and/or social consequences. In its most extreme form, plagiarism can include copying of an entire publication or unpublished work. More often, authors may make attribution errors, such as forgetting to cite others' works, improperly citing others' works, or the like.

DETAILED DESCRIPTION

Some currently-available computer systems exist for detecting plagiarism in papers. These currently-available systems typically allow authors, such as students, to submit papers for plagiarism checking. When these systems are used in school settings, a typical system is a closed system that analyzes a set of submitted papers in a similar manner. For example, such a system may be set to analyze a writing assignment for an entire college class. The typical closed system might send a report to an administrator, such as a teacher describing the plagiarism detected in the submitted papers. Such a closed system may not, however, provide feedback to the author to assist him or her with correcting attribution errors in the paper and is not likely configurable by individual authors of the system (e.g., the student authors) in terms of how the paper is analyzed for possible detection of plagiarism.

In certain embodiments, systems and methods are provided for content matching that allow authors such as students and researchers to submit documents for content-matching feedback. These systems and methods can provide reports to the authors describing any attribution errors in their documents. In addition, in certain embodiments the reports can recommend additional publications for research and can provide authors with access to these publications. Certain embodiments of the systems and methods also perform many other functions.

As used herein, the term "document," in addition to having its broad ordinary meaning, can include any written work, paper, digital representation of text and/or other multimedia, software, software code, combinations of the same, and the like.

For purposes of illustration, the methods or processes disclosed herein are described primarily in the context of a network resource such as a web site or network-based service. However, the disclosed processes need not be implemented as part of, or in conjunction with, a web site. For example, the processes described herein can be implemented as one or more applications on any processor-based system, whether networked or not.

These systems and methods will now be described with reference to the drawings summarized above. Throughout the drawings, reference numbers may be re-used to indicate correspondence between referenced elements. The drawings, associated descriptions, and specific implementation are provided to illustrate embodiments of the inventions described herein and not to limit the scope thereof.

In addition, methods and processes described herein are not limited to any particular sequence, and the blocks or states relating thereto can be performed in other sequences that are appropriate. For example, described blocks or states may be performed in an order other than that specifically disclosed, or multiple blocks or states may be combined in a single block or state. Moreover, the various modules of the systems described herein can be implemented as software applications, hardware and/or software modules, or components on one or more computers, such as servers. While the various modules are illustrated separately, they may share some or all of the same underlying logic or code.

Figure 1:
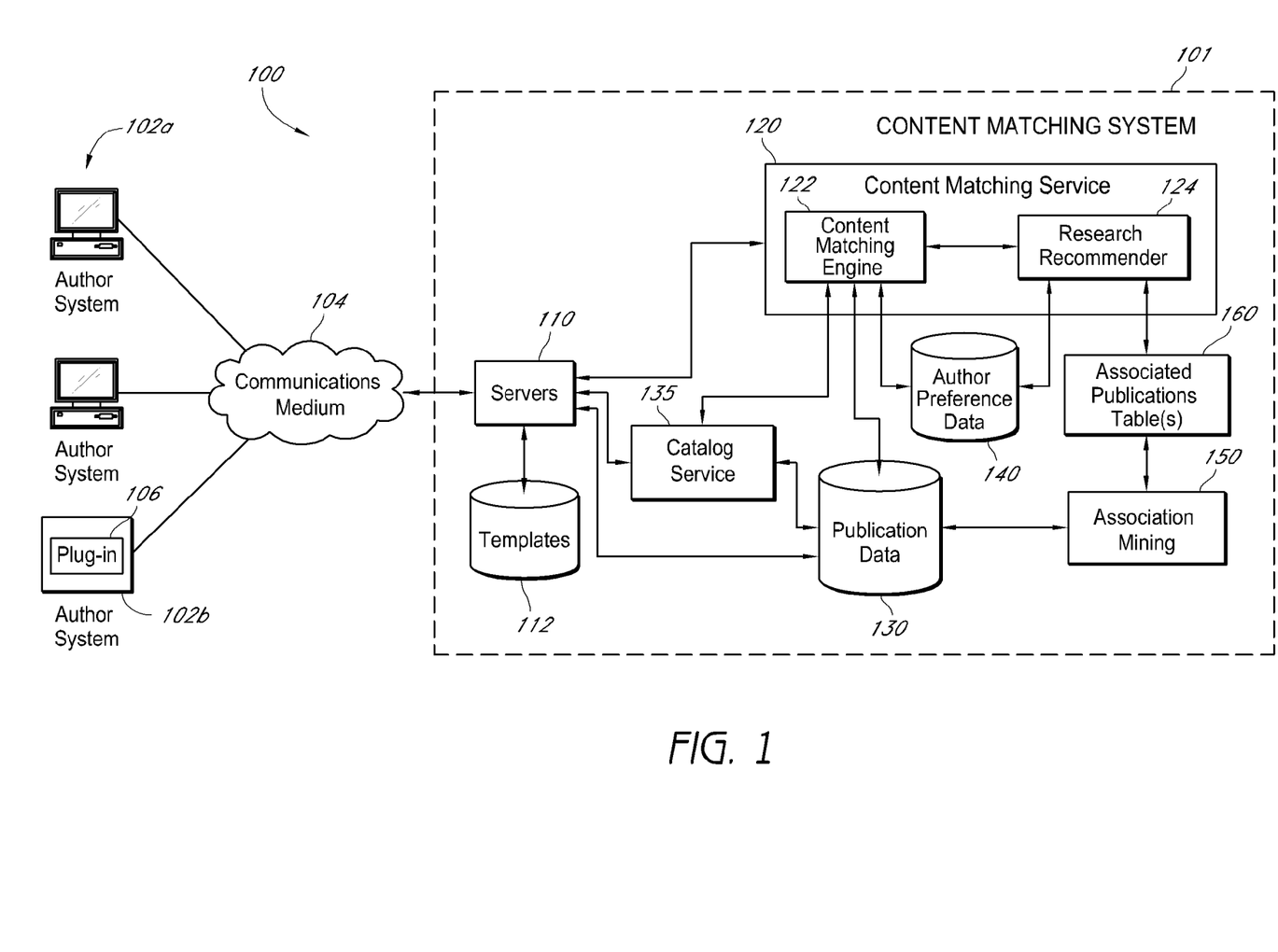
FIG. 1 illustrates an embodiment of a content matching system.

Referring to FIG. 1, an embodiment of a network environment 100 for generating content-matching feedback is shown. The network environment 100 includes a content matching system 101 that can be implemented using one or more computer systems, such as servers. In addition, the content matching system 101 may be implemented as a network resource, such as a web site or the like. In certain embodiments, the content matching system 101 enables authors to submit documents for content-matching feedback.

The content matching system 101 may be accessed by authors from author systems 102. Although shown as personal computers for purposes of illustration, the author systems 102 may include various other types of computing devices, such as web pads, personal digital assistants (PDAs), mobile phones, set-top television boxes, media players, laptop computers, tablets, desktop computers, electronic book readers, kiosks, and the like.

The content matching system 101 includes one or more servers 110 for communicating with the author systems 102 over a communications medium 104, which may be a network such as the Internet, a local or wide area network (LAN or WAN), intranet, or the like. The servers 110 can be web servers in some embodiments. As web servers, the servers 110 can process Hypertext Transfer Protocol (HTTP) and other protocol requests received over the communications medium 104 from the author systems 102. Additional protocols and components for providing communication between the author systems and servers via the communication medium 104 may be provided in various implementations.

In response to requests from the author system(s) 102, the servers 110 can dynamically generate content by accessing a repository of templates 112, which can include display templates that specify the layout and format of author interface displays such as web pages, widgets, Iframes, combinations of the same, and the like. For example, the servers 110 can generate author interfaces for submitting documents, for providing content-matching feedback, for providing research recommendations, for purchasing publications or portions thereof, and the like. The servers 110 can populate these templates with information that may be dependent on the particular author system 102 accessing a template, as may be determined, for example, using browser cookies or a login procedure.

In certain embodiments, authors can submit or upload content such as documents from their author systems 102 to the servers 110 to receive content-matching feedback. For example, the authors may use browser or other application software installed on their systems 102 to upload the documents. In response to receiving a document from an author system 102, the servers 110 may transmit the document to a content matching service 120. The servers 110 may, in turn, retrieve content-matching feedback from the content matching service 120 and provide this feedback to the author systems 102.

Some of the author systems 102, such as the author system 102b, may include a plug-in 106 for communicating with the content matching system 101. The plug-in 106 can be a software component that interfaces with a document creation program (e.g., a word processor). The plug-in 106 can access certain features of the content matching system 101 from within the author's document creation program. In response to a request for content-matching feedback from the author, for example, the plug-in 106 can use one or more application programming interfaces (APIs) to submit web service calls to the content matching service 120. In sending web service calls, the plug-in 106 may submit the author's document and a request for content-matching feedback. The servers 110 may, in turn, retrieve content-matching feedback from the content matching service 120 and provide this feedback to the plug-in 106. When the plug-in 106 receives the content-matching feedback from the servers 110, the plug-in 106 can display the feedback within the author's document creation program or in a separate author interface. Web-service calls to the content matching service 120 may also be submitted by applications running in the communications medium, such as network-based word-processing applications.

The content matching service 120 can be a software service, such as a web service, that analyzes the text of documents, provides feedback on attribution, generates recommendations for further research, and the like. In the depicted embodiment, the content matching service 120 includes a content matching engine 122 and a research recommender 124.

The content matching engine 122 can be a software component that analyzes documents submitted by authors for originality. In certain embodiments, the content matching engine 122 uses one or more natural language processing techniques to analyze text within documents. These techniques might include preliminary steps such as removing common (stop) words (e.g., articles), word stemming, and the like. The natural language processing techniques may further include pattern matching algorithms for comparing the text of the document to the text of other publications. One example pattern matching algorithm that may be used is latent semantic analysis.

In certain embodiments, the content matching engine 122 can compare at least a portion of the text of the document with at least a portion of the text of one or more publications stored in a publication data repository 130. The content matching engine 122 can compare the entire document with the publications, or the content matching engine 122 can compare a part of the document with the publications. For example, the content matching engine 122 may remove vowels from the document and compare the consonants in the document with consonants in the publications. In another example, the content matching engine 122 may process the document to identify the most statistically significant phrases or terms and compare the results. Alternatively, the content matching engine 122 may compare a representation, such as a transformation, of at least part of the document with a like representation of at least some of the publications. For instance, the content matching engine 122 may use a cryptographic hash function to generate a signature from at least a portion of the document and compare the signature with signatures of the publications. One example hash function that may be used is the MD5 algorithm.

The publication data repository 130 can include publications from many sources. The publications can include electronic copies of books, periodicals, webpage content, blogs, newspaper articles, and the like. In addition, the publications can include previous submission of author documents. For example, the publication data repository 130 can include data corresponding to physical publications that have been scanned. The submissions of author documents can be optional in certain embodiments. The publication data repository 130 may also include citations to the publications. These citations may be in several citation formats. The publications may be stored as whole publications or portions thereof, including consonant-only portions, hash signatures, combinations of the same, and the like.

Publications can be obtained using a catalog service 135 in certain embodiments. The catalog service 135 may be a software component that automatically accesses networks such as the Internet to obtain the publications, e.g., by crawling web sites, downloading articles from publisher's websites, and the like. In addition, certain publications, such as books, periodicals, and the like, may be optically scanned into the publication data repository 130 (e.g. using optical-character recognition). The catalog service 135 can periodically update the publication data in the repository 130 in order to maintain a current or relatively current set of publication data. In addition, the catalog service 135 may generate a catalog author interface for authors to browse and purchase the publications in the repository 130.

As described above, authors might make attribution errors such as forgetting to include citations to publications, improperly citing publications, or the like. By using pattern matching algorithms to match the content of the author-generated document with content of publications in the publication data repository 130, the content matching engine 122 can determine whether the author made attribution errors. The content matching engine 122 can provide content-matching feedback to the author to report any potential plagiarism to the author. The content-matching feedback might include, for example, suggestions on which passages of a document's text should be cited, suggested citation formats, corrections to citations, and the like.

The content-matching feedback may also include a score, percentage, or level to which un-cited or improperly-cited portions of the submitted document match the content of other existing publications. The score, percentage, or level may also correspond to an amount to which some or all of the content in the document matches the content of an existing publication. In one embodiment, the score, percentage, or level of the content-matching feedback may be increased if the style of the document matches the style of an existing publication. Style may include the formatting, fonts, and other non-content features of the document. The content matching engine 122 may provide the content-matching feedback by sending an content-matching feedback report or the like to the author's system 102 via the servers 110. An example content-matching feedback report is described below with respect to FIG. 4.

The content-matching feedback can help authors correct attribution errors. As a result, when authors submit their documents to a teacher or to another reviewing entity (such as a publisher), the authors may be less likely to be accused for plagiarism. In one embodiment, the content matching engine 122 can generate a certificate or the like that certifies that an author's document was checked for plagiarism or attribution errors. The content matching engine 122 can submit this certification to an author's teacher or other reviewing entity upon the author's request or upon the teacher or reviewing entity's request. The certification may, for example, designate a particular "score" that could reflect either the strength of the match with other content or the probability of plagiarism. In other embodiments, if such a score met a particular threshold, the certificate may indicate whether the document has met the threshold for passing the plagiarism analysis. The certification may also include a signature generated using a cryptographic hash of the document. As hash signatures can differ substantially for documents with minor differences, the signature provided with the certification can indicate which version of the document was analyzed. In such an embodiment, the content matching system 101 can operate as third party certification clearinghouse to provide and/or validate certificates to requesting entities.

The content matching engine 122 may also provide options for customizing the way that the content matching engine 122 analyzes documents. For instance, the content matching engine 122 may provide configuration options that allow the author to specify author preferences. These configuration options may be accessed in some embodiments using the plug-in 106 of the author system 102b. Alternatively, the configuration options may be accessed using a browser or other application. The content matching engine 122 may store these preferences in an author preference data repository 140. For instance, the author preferences might include options for causing the content matching engine 122 to ignore any text appearing within quotes. As another example, an author might use a particular citation format, such as the format espoused by the Chicago Manual of Style. The configuration options may also include feedback preferences, which may allow the author to adjust the level or type of content-matching feedback provided by the content matching engine 122.

Other examples of configuration options that an author might adjust include settings for determining according to a distance between matching terms or phrases. The distance between the terms or phrases can be measured by a number of intervening words, sentences, paragraphs, or the like in the document. Another possible configuration option is to include settings that allow an author to set a minimum number of matching terms to reduce false content-matching feedback. For example, an author might wish to configure the system 101 to ignore potential matches of phrases having a length of four words or less. Another configuration option might be to configure the system to ignore certain words, such as capitalized words, proper nouns, catch phrases, and the like. Many other configuration options may be provided in various embodiments.

The content matching engine 122, in addition to or in place of providing configuration options, may be able to learn author's preferences and store the learned author preferences in the repository 140. The content matching engine 122 might observe, for instance, that an author generally uses one citation format over another. In response, the content matching engine 122 might determine that the author prefers this style of citation and save a preference to that effect in the repository 140.

Sometimes, authors may cite sources that are not preferred sources for citation. For example, authors might cite an online encyclopedia instead of a periodical article. Other times, authors may cite some sources but wish to include citations to additional sources in their documents. In certain embodiments, the content matching engine 122 can also retrieve citations to additional publications as research recommendations. The research recommendations can include publications (or citations to publications) that are similar to one or more of the publications cited in an author's paper. The content matching engine 122 may retrieve these research recommendations from the research recommender 124.

The research recommender 124 may generate recommendations using data obtained from one or more associated publications tables 160. The associated publications tables 160 can include publication-to-publication associations or mappings created by an association mining component 150. The association mining component 150 can create these associations by analyzing data stored in the publication data repository 130. Additional details on the recommendation generation process are described below with respect to FIG. 3.

In presenting content-matching feedback and/or research recommendations to the author, the content matching engine 122 can provide the ability for the author to purchase publications or portions thereof. The content matching engine 122 can, for example, offer portions of the publications cited as research recommendations for purchase. Additional details on providing publications to authors are described below with respect to FIG. 4.

Although the content matching system 101 has been described primarily in the context of comparing text, more generally, the content matching system 101 may compare any content with other content. One example of such content is software code. For instance, in certain embodiments the author may wish to submit a document containing software code to the content matching engine 122. At least a portion of the software code may be compared with other software code stored in the publication data repository 130. The software code in the publication data repository 30 may include, for example, open source software code, malicious code, and the like. The content matching engine 122 may determine an extent to which submitted source code includes open-source software code. Additionally, the content matching engine 122 can provide feedback on open source licenses associated with the detected open-source software code. This feedback can help the author cite open-source licenses in the document or acknowledge rules of compliance.

Figure 2:
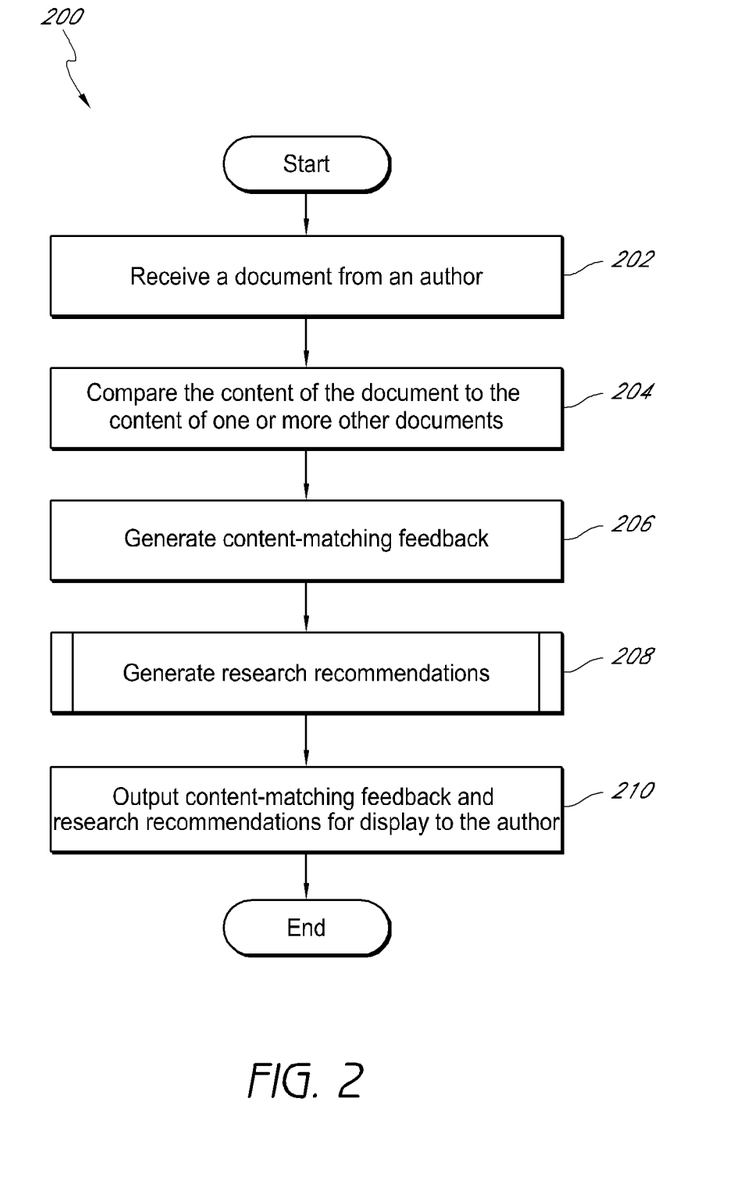
FIG. 2 illustrates an embodiment of a process for generating content-matching feedback.

FIG. 2 illustrates an embodiment of a content-matching feedback process 200 for generating content-matching feedback. The content-matching feedback process 200 can be implemented by the content matching system 101 described above. In particular, in certain embodiments the content-matching feedback process 200 may be implemented by the content matching engine 122 and the research recommender 124.

At block 202, a document can be received from an author. The document may also be provided from an author's computer system through author interaction with a browser application, a plug-in, or the like. The author may submit the document to obtain feedback on the author's usage of quotations, citations, and the like. The document may be automatically submitted as part of saving the document or uploading the document to another network resource. The document may be received by the content matching engine 122.

The content of the document can be compared to the content of one or more other documents at block 204. This comparison can include using pattern matching algorithms to compare the text of the document with the text of publications and/or previously-submitted author documents. This block 204 can also be implemented by the content matching engine 122.

At block 206, content-matching feedback responsive to the comparison of the documents is generated. The content-matching feedback may be generated, for example, by the content matching engine 122. The content-matching feedback can include advice on correcting citation or bibliographic errors, correcting quotations, and the like.

Research recommendations may be generated at block 208. This block may be performed by the research recommender 124. Research recommendations may be generated to assist the author in conducting further research. The research recommendations may include publications (or citations to publications) that are related to publications cited by the author. The publications provided as recommendations may be more authoritative than publications cited by the author, or the publications provided as recommendations may supplement the publications cited by the author. The process of generating recommendations is described in more detail below with respect to FIG. 3.

At block 210, the content-matching feedback and research recommendations may be output for display to the author. The feedback and recommendations may be provided in a single author interface, such as a web page, document, or the like. The content-matching feedback and/or recommendations may also be provided within the author's document or in a separate document. The content-matching feedback and research recommendations may be sent to the author using the content matching engine 122.

Figure 3:
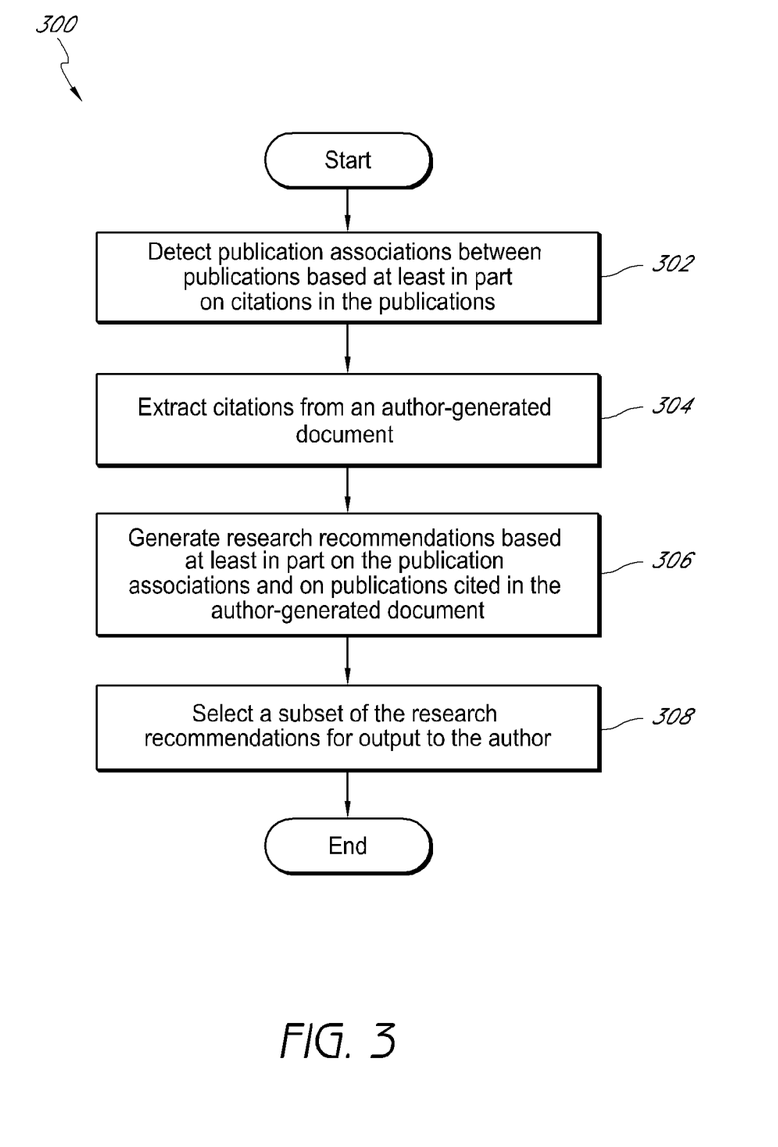
FIG. 3 illustrates an embodiment of a process for generating research recommendations.

FIG. 3 illustrates an embodiment of a research recommendation process 300 for generating research recommendations. The research recommendation process 300 can be implemented by the content matching system 101 described above. In particular, in certain embodiments the research recommendation process 300 may be implemented by the research recommender 124, association mining component 150, and associated publication tables 160.

At block 302, publication associations can be detected. In certain embodiments, this block 302 need not be performed each time an author requests recommendations. As described in more detail below, this block 302 may be performed as a pre-processing step and/or concurrently with blocks 304-308. The publication associations can be detected in block 302 based at least in part on citations in the publications. For example, referring again to FIG. 1, the association mining module 150 can mine citation data from the publication data repository 130. This citation data can include citations within the text of publications in the publication data repository 130. The association mining module 150 can detect associations between publications based at least in part on the frequency that different citations occur in the same publication. For example, if a citation to a particular journal article is mentioned multiple times in one publication, and if a citation to a particular book is also mentioned several times in that publication, then the association mining module 150 might create an association between the journal article and the book.

The association mining module 150 may store the publication associations in one or more associated publications tables 160. For example, the association mining module 150 might store a mapping that links the publications by name, by citation, by links to files containing their publication text, or the like. The association mining module 150 can assign scores to the associated publications that indicate a degree of association between publications or portions of publications. A pair of publications that are cited together relatively frequently, for example, might have a higher score than a pair of publications cited together relatively less frequently. Other ways in which the association mining module 150 might create associations may include detecting the proximity of citations within a publication and detecting similar publications based on an analysis of their text. For example, the analysis may use latent semantic analysis.

In addition, the association mining module 150 may use collaborative filtering to detect related publications. Collaborative filtering can include detecting purchase-based and view-based associations between items such as publications. Example algorithms that may be used to generate these associations are described in U.S. Pat. No. 6,853,982, entitled "Content personalization based on actions performed during a current browsing session," issued Feb. 8, 2005, the disclosure of which is hereby incorporated by reference in its entirety.

The association mining module 150 may operate in an off-line process. Thus, in certain embodiments the associated publications tables 160 are pre-generated prior to providing research recommendations to an author. This off-line process may be performed, for example, on a periodic or aperiodic basis during off-peak processing times. Alternatively, the association mining module 150 may also mine data concurrently with other actions being performed by the content matching system 101. For example, the associated publications tables 160 may receive updates from the association mining module 150 while the research recommender 124 is using the associated publications tables 160 to generate recommendations. The association mining module 150 may update the associated publications tables 160 once daily or may update more or less frequently.

Turning again to FIG. 3, citations can be extracted from an author-generated document at block 304. The citations may be extracted by the research recommender 124. At block 306, research recommendations may be generated based at least in part on the publication associations described above and on publications cited in the author-generated document. For example, the research recommender 124 may look up one or more of the citations (or publications referenced by the citations) from the document in the associated publications tables 160 to retrieve associated publications. The retrieved set of associated publications can include scores or rankings based on the relatedness of the associated publications to the one or more citations from the author-generated document.

At block 308, a subset of the research recommendations may be selected for output to the author. This block may be implemented by the research recommender 124 providing a subset of the associated publications as recommendations. The subset can include, for example, a most highly-ranked set of associated publications. These recommendations can be provided to the content matching engine 122, which can in turn provide the research recommendations to the author.

In addition to the recommendation techniques described above, in certain embodiments the research recommender 124 can provide recommendations based on the author's social network. The research recommender 124 may, for instance, communicate with a social networking web site or network resource using an API to retrieve papers written and posted to the web site by the author's friends or by people the author follows. The research recommender 124 may recommend to the author publications cited in the papers of the author's friends.

Figure 4:
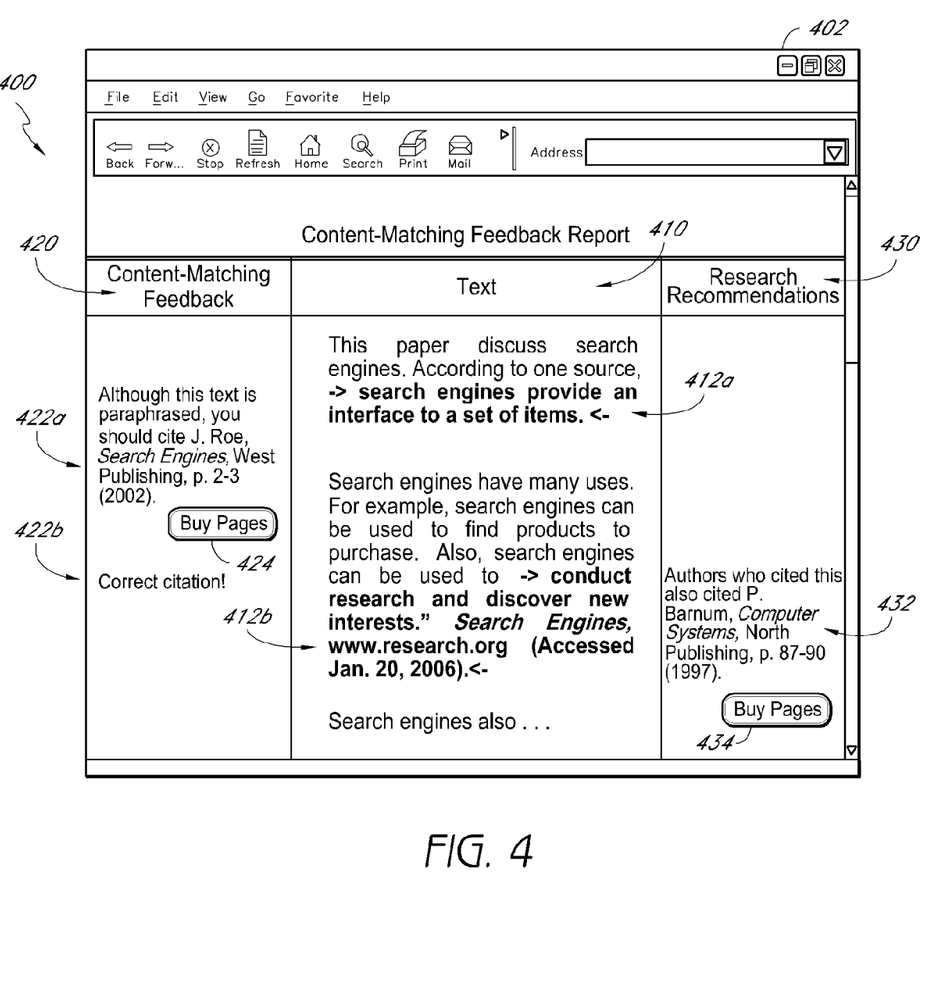
FIG. 4 illustrates a screen display of an example content-matching feedback report for providing content-matching feedback to an author.

FIG. 4 illustrates an example content-matching feedback report display 400 for providing content-matching feedback to an author. The content-matching feedback report display 400 can be generated by the content matching system 101 described above. In particular, in one embodiment, the content-matching feedback report display 400 may be generated by the content matching engine 122. The content-matching feedback report display 400, in various implementations, can provide a visual author interface for reporting plagiarism issues, making research recommendations, and the like.

For purposes of illustration, the content-matching feedback report display 400 is shown in a web browser 402. The content-matching feedback report display 400 could instead be displayed within a separate application from a browser. For instance, the content-matching feedback report display 400 could be displayed within an author-generated document. In addition, while an example layout of the content-matching feedback report 400 is shown, the layout may be varied substantially in various embodiments.

In the depicted embodiment, text 410 of a document includes emphasized citation portions 412. Two citation portions 412 are shown, including a first citation portion 412*a* and a second citation portion 412*b*. The first citation portion 412*a* in the text 410 does not actually cite a source, whereas the second citation portion 412*b* does cite a source.

Content-matching feedback 420 is depicted in a column next to the text 410. The content-matching feedback 420 includes citation analysis 422. Two examples of citation analysis 422 are shown. The citation analysis 422*a* corresponds to the citation portion 412*a*, noting that a particular publication ("J. Roe, *Search Engines*") should have been cited. In contrast, the citation analysis 422*b* indicates that the citation portion 412*b* of the text 410 includes a proper citation.

A button 424 with the label "Buy Pages" is listed below the citation analysis 422*a*. The button 424 is one example of an author interface control that can offer an author the opportunity to purchase some or all of the pages from the publication described in the citation analysis 422*a*. By offering publications or portions thereof, the content-matching feedback report 400 can assist the author in conducting research. Referring again to FIG. 1, if an author indicates a desire to purchase or view publications (e.g., by pressing the button 424), the content matching engine 122 may communicate with a catalog service 135 to request the pages from the publication data 130. In addition, the catalog service 135, which may be a software service or the like, may provide an interface for the author to purchase pages or entire publications.

Referring again to FIG. 4, the content-matching feedback report 400 may offer portions of publications (such as cited passages) for free while allowing the author to purchase the entire publication. The free portions of the publications may be ad-supported. Or, authors may pay for subscriptions to access publications.

In a column to the right of the text 410, research recommendations 430 are shown. The research recommendations 430 include an example research recommendation 432 depicted next to the citation portion 412*b*. The research recommendation 432 indicates a possible additional source to cite in place of or in addition to the source cited in the citation portion 412*b*. Moreover, another button 434 is shown in proximity to the research recommendation 432. Similar to the button 424, the button 434 allows the author to purchase pages from the publication cited in the research recommendation 432.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment.

Each of the processes, components, and algorithms described above may be embodied in, and fully automated by, code modules executed by one or more computers or computer processors. The code modules may be stored on any type of computer-readable medium or computer storage device. The processes and algorithms may also be implemented partially or wholly in application-specific circuitry. The results of the disclosed processes and process steps may be stored, persistently or otherwise, in any type of computer storage. In one embodiment, the code modules may be configured to execute on one or more processors, including subprocessors. In addition, the code modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, variables, combinations of the same, and the like.

The various features and processes described above may be used independently of one another, or may be combined in various ways. All possible combinations and subcombinations are intended to fall within the scope of this disclosure. In addition, certain method or process steps may be omitted in some implementations.

While certain embodiments of the inventions disclosed herein have been described, these embodiments have been presented by way of example only, and are not intended to limit the scope of the inventions disclosed herein. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for generating content-matching feedback on author-generated documents, the system comprising:
   a content matching engine comprising computer hardware configured to:
   provide a user interface for authors to submit documents for content matching feedback to avoid accidental plagiarism,
   receive a document from an author over a communications medium, the document generated by the author,
   compare at least a portion of the document to at least a portion of one or more first publications using one or more pattern-matching techniques, generate content-matching feedback responsive to the comparison, the content-matching feedback comprising suggestions for correcting attribution errors in the document to thereby assist the author in avoiding accidental plagiarism, generate a certificate certifying that the document was checked for plagiarism, thereby enabling the author to indicate to a reviewing entity that the document was checked for plagiarism, and output the content-matching feedback for display to the author; and a research recommender in communication with the content matching engine, the research recommender configured to:

detect publication associations between a plurality of second publications based at least in part on citations in text of the plurality of second publications, generate one or more research recommendations based at least in part on cited publications in the text of the document and on the publication associations, the one or more research recommendations comprising one or more of the second publications that have publication associations with one or more of the cited publications in the text of the document, and output a subset of the one or more research recommendations for display to the author.

2. The system of claim 1, wherein the content-matching feedback comprises suggested citations to at least some of the one or more first publications.

3. The system of claim 1, wherein the one or more research recommendations comprise citations to the one or more second publications.

4. The system of claim 3, wherein the content matching engine is further configured to offer to the author one or more pages of the one or more first or second publications.

5. The system of claim 1, wherein the content-matching feedback comprises suggested corrections to citation format.

6. The system of claim 1, wherein the content matching engine is further configured to compare at least a portion of the document to at least a portion of the one or more publications by comparing a first transformation of at least a portion of the document with a second transformation of at least a portion of the one or more first publications.

7. The system of claim 6, wherein the content matching engine is further configured to perform the transformation of at least a portion of the document by applying a hash function to at least a portion of the document.

8. The system of claim 1, wherein the content matching engine is further configured to provide configuration options to the author.

9. The system of claim 8, wherein the configuration options comprise options for selecting a preferred citation format.

10. The system of claim 8, wherein the configuration options comprise options for ignoring at least a portion of the text in the document.

11. The system of claim 1, wherein one or both of the content matching engine and the research recommender are implemented by a computer system comprising computer hardware.

12. A computer-implemented method for generating content-matching feedback on author-generated documents, the method comprising:

providing functionality for authors to submit documents for content matching feedback to avoid accidental plagiarism;

receiving a document from an author over a communications medium;

receiving a request from the author for content-matching feedback about the document;

generating content-matching feedback responsive to the request, the generating of content-matching feedback comprising performing a content matching analysis of at least a portion of the document with at least a portion of one or more second documents to thereby assist the author in avoiding accidental plagiarism;

generating a certificate certifying that the document was checked for plagiarism, thereby enabling the author to indicate to a reviewing entity that the document was checked for plagiarism;

detecting publication associations among a plurality of publications based at least in part on a number of times the publications citations were cited together;

generating one or more research recommendations based at least in part on citations in the document and on the publication associations, the one or more research recommendations comprising a citation to at least one of the publications; and outputting the content-matching feedback and the one or more research recommendations for display to the author;

wherein at least said generating content-matching feedback is performed by a computer system comprising computer hardware.

13. The method of claim 12, wherein receiving the document from the author further comprises receiving application programming interface (API) calls from a plug-in installed on the author's computer system.

14. The method of claim 12, wherein receiving the document from the author further comprises receiving application programming interface (API) calls over a communications medium.

15. The method of claim 12, wherein the content-matching feedback comprises suggested citations to one or more second publications.

16. The method of claim 12, further comprising offering to the author one or more pages of the one or more first or second publications.

17. The method of claim 12, wherein the content-matching feedback comprises suggested corrections to citation format.

18. The method of claim 12, wherein said generating a certificate certifying that the document was checked for plagiarism comprises generating a signature from a hash of at least a portion of the document.

19. The method of claim 12, wherein the method is implemented by a computer system comprising computer hardware.

20. The method of claim 19, wherein the computer system comprises a plurality of computing devices.

21. A non-transitory computer-readable storage medium having a computer-executable component, the computer-executable component comprising computer instructions configured to cause one or more processors to at least:

submit a document generated by an author over a communications medium to a content matching engine in response to a request from the author for content-matching feedback to avoid accidental plagiarism;

receive content-matching feedback from the content matching engine over the communications medium, the content-matching feedback comprising suggestions for correcting any attribution errors in text of the document to thereby assist the author with avoiding accidental plagiarism;

receive a certificate from the content matching engine, the certificate certifying that the document was checked for plagiarism, thereby enabling the author to indicate to a reviewing entity that the document was checked for plagiarism; and provide configuration settings, the configuration settings comprising options for adjusting the content-matching feedback received from the content matching engine.

22. The non-transitory computer-readable storage medium of claim 21, wherein the content-matching feedback comprises suggested citations to one or more publications.

23. The non-transitory computer-readable storage medium of claim 21, wherein the content-matching feedback comprises suggested corrections to citation format.

24. The non-transitory computer-readable storage medium of claim 21, wherein the configuration settings further comprise options for selecting a preferred citation format.

25. The computer-readable storage medium of claim 21, in combination with a computer system comprising computer hardware.

26. A computer-implemented method for comparing content, the method comprising:

providing functionality for authors to submit content for plagiarism checking;

receiving first content generated by an author;

comparing at least a portion of the first content to at least a portion of second content using one or more content-matching techniques to detect matched content;

providing content-matching feedback to the author, the content-matching feedback comprising suggestions for changing at least a portion of the first content based on the matched content;

providing a certificate certifying that the first content was checked for plagiarism, thereby enabling the author to indicate to a reviewing entity that the first content was checked for plagiarism; and providing configuration settings to the author, the configuration settings comprising options for adjusting the content-matching feedback provided;

wherein the method is performed by a computer system comprising computer hardware.

27. The method of claim 26, wherein the configuration settings further comprise options for selecting a preferred citation format.

28. The method of claim 26, wherein the first content comprises a document and wherein the second content comprises a plurality of publications.

29. The method of claim 26, wherein the first content comprises code.

30. The method of claim 26, wherein the configuration settings further comprise options for ignoring at least some of the first content.

* * * * *